United States Patent [19]

Sasaki et al.

[11] 4,403,094
[45] Sep. 6, 1983

[54] DEEP-DYEABLE POLYESTER FIBER

[75] Inventors: Yoshiyuki Sasaki, Takatsuki; Mitsuo Kuwabara; Masayuki Tani, both of Ibaraki, all of Japan

[73] Assignee: Teijin Limited, Osaka, Japan

[21] Appl. No.: 270,360

[22] Filed: Jun. 4, 1981

[30] Foreign Application Priority Data

Jun. 13, 1980 [JP] Japan ................................ 55-79099

[51] Int. Cl.³ ............................................. C08G 63/16
[52] U.S. Cl. ............................ 528/308.2; 264/176 F; 528/293; 528/294; 528/295
[58] Field of Search ............ 528/293, 294, 295, 308.2; 264/176 F

[56] References Cited

U.S. PATENT DOCUMENTS

| 3,018,272 | 1/1962 | Griffing et al. | 528/293 |
| 3,185,671 | 5/1965 | Horn | 528/295 |
| 3,471,446 | 10/1969 | Delves et al. | 528/295 |
| 3,528,947 | 9/1970 | Lappin et al. | 528/295 |
| 3,624,034 | 11/1971 | Price et al. | 528/295 |
| 3,639,352 | 2/1972 | Katsuura et al. | 528/293 |
| 3,700,642 | 10/1972 | Mizuno et al. | 528/293 |
| 3,725,351 | 4/1973 | Harrison et al. | 528/295 |
| 3,836,508 | 9/1974 | Radlmann et al. | 528/295 |
| 3,856,753 | 12/1974 | Henry et al. | 528/295 |
| 3,899,470 | 8/1975 | McGee et al. | 528/295 |
| 3,922,250 | 11/1975 | Cleary | 528/295 |
| 4,092,299 | 5/1978 | MacLean et al. | 528/294 X |
| 4,161,577 | 7/1979 | Price et al. | 528/295 |

OTHER PUBLICATIONS

Journ. Appl. Polym. Sci. 6, pp. 111-113, (1962).

Primary Examiner—Lucille M. Phynes
Attorney, Agent, or Firm—Burgess, Ryan & Wayne

[57] ABSTRACT

A deep-dyeable polyester fiber of soft hand comprising recurring units consisting mainly of ethylene terephthalate and —SO$_3$M groups in which M is an alkali metal, and having a degree of crystallinity $\chi_p$ of from 30 to 55%, a degree of orientation $\Delta n$ of from 0.06 to 0.12 and $\chi_p/\Delta n$ of from 350 to 550. The fiber can be produced by heat treating a melt spun, slightly oriented filament under relaxation and then drawing the heat treated filament at a low temperature.

4 Claims, 2 Drawing Figures

DEEP-DYEABLE POLYESTER FIBER

BACKGROUND OF THE INVENTION

1. Field of the Invention

The invention relates to a deep-dyeable polyester fiber, more particularly to a polyester fiber having very high dyeability as well as soft hand and high pilling resistance.

2. Description of the Prior Art

Polyester fibers have excellent physical properties and, thus, are broadly utilized for clothing and industrial materials. However, polyester fibers have a drawback in that they are hard to dye in boiling water under normal pressure. In order to improve the dyeability of a polyester fiber, there has been proposed the use of polyesters containing various third components. Further, it is described, in British Pat. No. 735,171, that the affinity for a dyestuff of a polyester fiber can be improved by subjecting the polyester fiber to heat treatment at a temperature higher than 200° C. after drawing. However, in conventional polyester fibers, further improvement in the dyeability is still earnestly desired.

Further, a polyester fiber has a relatively hard hand. Therefore, the polyester fiber has been mainly recommended as a material for clothing for gentlemen. However, a woven or knitted fabric having a close texture and a soft hand which is useful as clothing for ladies, particularly autumn and winter clothing can not be obtained from the conventional polyester fiber.

SUMMARY OF THE INVENTION

It is the primary object of the present invention to providde a polyester fiber having very high dyeability as well as other excellent physical properties such as softness and pilling resistance.

Thus, the present invention provides a deep-dyeable polyester fiber comprising recurring units consisting mainly of ethylene terephthalate and —SO$_3$M groups in which M is an alkali metal, and having a degree of crystallinity $\chi_p$ of from 30 to 55%, a degree of orientation $\Delta n$ of from 0.06 to 0.12 and $\chi_p/\Delta n$ of from 350 to 550.

The polyester fiber of the present invention can be produced by a process comprising the steps of:

melt-spinning a fiber-forming polyester containing recurring units consisting mainly of ethylene terephthalate through a spinneret to form a slightly oriented filament having a double refraction index (degree of orientation $\Delta n$) of from 0.02 to 0.08;

heat treating the undrawn filament at an elevated temperature without applying a positive tension or drawing thereto to obtain a highly crystallized filament having a degree of crystallinity $\chi_p$ of from 30 to 55%; and, drawing the crystallized filament at a low temperature at a draw ratio of an increased ratio in denier during said heat treatment of from plus 1.0 to 1.7.

DESCRIPTION OF THE PREFERRED EMBODIMENTS

It has been found that the polyester fiber according to the present invention has extremely high dyeability so that it can be dyed from moderate to highly deep color shades in boiling water under normal pressure. The polyester fiber has also a desirable soft hand and a high pilling resistance.

The polyester fiber according to the present invention has a degree of crystallinity $\chi_p$ of from 30 to 55%, a degree of orientation $\Delta n$ of from 0.06 to 0.12, and $\chi_p/\Delta n$ of from 350 to 550, preferably from 400 to 500. If the degree of crystallinity is lower than 30%, the fiber does not exhibit suitable strength or elongation and, thus, the fiber can not be further processed into a textile fabric or the like. On the contrary, the production of a polyester fiber having a degree of crystallinity higher than 55% is expensive because of the necessity of a long crystallizing time.

In the case where the degree of orientation $\Delta n$ is lower than 0.06, the fiber also does not exhibit suitable strength and elongation. Where the degree of orientation is higher than 0.12 the fiber does not have satisfactory dyeability. Further, in order that the polyester fiber of the present invention has desirable dyeability and satisfactory physical properties, it is essential that $\chi_p/\Delta n$ of the polyester fiber is in a range from 350 to 550, as is described in detail hereinafter with reference to Example 1.

The polyester fiber of the present invention preferably has a strength at final turning point Sy of higher than 1.2 g/d. The fiber having such strength at final turning point has excellent processability and can be used to obtain an even knitted or woven fabric. It is also preferable that the polyester fiber has a breaking strength St of lower than 2.5 g/d, since such a fiber provides a fabric high pilling resistance.

Hereinbelow, the process for the production of the polyester fiber of the present invention will be illustrated, in detail, with reference to practical non-limitative examples.

Figure 1:
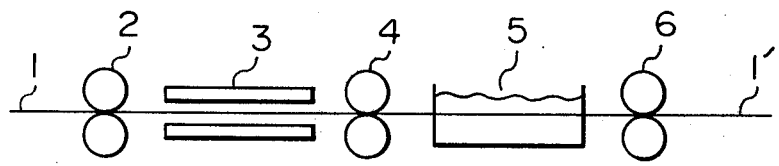
FIG. 1 is a flow sheet schematically illustrating a process for producing the polyester fiber of the present invention.

Referring now to FIG. 1, a tow 1 of slightly oriented undrawn polyester filaments having a denier of $20 \times 10^4$ and a double refraction index ($\Delta n$) of 0.04 and which were spun at a high spinning speed (e.g. 3500 m/min) is heat treated under relaxation to a temperature of 200° C. by means of heater 3 disposed between two pairs of rollers 2 and 4 in a 10% overfeed state. As a result of the heat treatment, the tow 1 is converted to a low oriented, highly crystallized, undrawn tow having a denier of $22 \times 10^4$ (i.e. an increased ratio in denier is 0.1) and a degree of crystallinity $\chi_p$ of 41%. In this case, it is necessary that the undrawn tow 1 has a degree of orientation ($\Delta n$) of from 0.02 to 0.08 as expressed in terms of the double refraction index. If the degree of orientation of the tow is less than 0.02, the tow has no nucleus for crystallization which is able to grow into a crystal when the tow is subjected to heat treatment. Accordingly, even if the tow is subjected to elevated temperatures, no crystallization occurs in the tow and the filaments constituting the tow are fused with each. Such fused tow is useless. On the other hand, if the tow has a high degree of orientation exceeding 0.08, the crystallinity thereof becomes excessive when subjected to heat treatment. In this case, even if the resultant tow is subsequently drawn, the drawn filaments exhibit a stiff hand because of their high degree of crystallinity in heat treating the slightly oriented undrawn filaments to effect crystallization, special attention should be paid to the fact that when the filaments are heat treated to convert them to highly oriented, crystallized filaments while being drawn, the resultant filaments can not exhibit a soft hand. That is, it is necessary that the heat treatment is carried out so that the molecules of the filaments are folded. It is preferable that the heat treatment is carried out under relaxation at an overfeed of 5% or more, more preferably 10% or more. Also, a very high degree of crystallinity $\chi_p$ of 30% or more should be attained in the heat treated filaments. For this purpose, it is preferable that the heat treatment is carried out under the above mentioned relaxation conditions at a temperature of at least 130° C., more preferably at least 150° C. In order to ensure that the undrawn filaments are crystallized without being fused with each other when exposed to such elevated temperatures under relaxation conditions, it is important that the undrawn filaments have a slight degree of orientation. This slight degree of orientation may be imparted to the undrawn filaments by the following processes:

a fiber-forming polyester is melt spun by a high speed spinning method to impart a slight degree of orientation to the resultant filaments during the spinning procedure, as in the case of this embodiment;

a fiber-forming polyester is melt spun by a low speed spinning method while the resultant filaments are rapidly cooled, to impart a slight degree of orientation to the filaments, and;

a fiber-forming polyester is melt spun by a low speed spinning method and the resultant undrawn filaments are drawn to some extent so that a slight degree of orientation is imparted thereto.

The low oriented, highly crystallized, undrawn filaments thus prepared are then drawn at a draw ratio of 1.4 by means of pair of rollers 6 while the filaments are being passed through warm water bath 5 having a temperature of 40° C. During the drawing procedure, special attention must be paid to the temperature at which the drawing is effected. If the undrawn filaments are drawn while being plasticized at elevated temperatures as in the case with a conventional drawing procedure for polyester filaments, the crystals of the polyester are destroyed and extended, which causes the molecules of the polyester to be arranged in a highly oriented state. Such polyester filaments exhibit a stiff hand as do conventional polyester filaments. In order to avoid this, the drawing precedure must be effected at a low temperature so as not to destroy the fold structure of the polyester molecule. For this purpose, it is preferable to carry out the drawing procedure at normal temperature. In the case where lap occurs due to the breakage of the monofilaments, however, some quantity of heat may be applied to the filaments by means of the warm water bath as described above in this embodiment. Even if the warm water bath is used, it is preferable that the temperature of the water bath does not exceed the glass transition temperature of the polyester so as to avoid the rearrangement of the molecules thereof. Also, if the draw ratio is too high, the rearrangement of the polyester molecules proceeds to an undesireable extent. If the degree of shrinkage of the filaments is increased in the heat treatment prior to the drawing procedure, the filaments may be drawn at an increased draw ratio corresponding to the increased degree of shrinkage. Even in consideration of this, however, it is necessary that the draw ratio is an increased ratio in denier due to the shrinkage during the heat treatment plus 1.7 or less, preferably, an increased ratio in denier plus 1.5 or less.

In the case of conventional polyester filaments, if the draw ratio is low, the resultant filaments are inferior in functional characteristics and useless for practical use. Contrary to this, even if the filaments of the present invention are drawn at a low draw ratio, the resultant drawn filaments exhibit a high first-order yield point and are able to retain functional characteristics because the filaments have been highly crystallized prior to the drawing procedure. Therefore, the filaments of the present invention may be drawn at a significant low draw ratio. Nonetheless, it is necessary that the draw ratio is at least an increase ratio in denier due to the shrinkage during the heat treatment plus 1.0, preferably, an increased ratio in denier plus 1.1 or more.

The drawn tow 1' having a denier of $16 \times 10^4$ may optionally be crimped by using a stuffing box type crimping machine and, then, cut to provide staple fibers. In this case, because of drawing at a low temperature, the resultant drawn tow has distortion in its fiber structure resulting in high shrinkage. Therefore, when a drawn tow having a low shrinkage is desired, the resultant drawn tow may be set so as to obtain the desired tow. In this case, if the drawn tow is set while being excessively extended, the orientation of the fibrous structure proceeds to an excessive degree. Accordingly, it is desirable that the drawn tow is subjected to a constant length or relaxation setting. For example, prior to the crimping procedure, the drawn tow may be subjected to a constant length setting process using heated rolls. Also, after the crimping procedure, the crimped tow may be dry heat free-set on a conveyor. Alternatively, the staple fibers cut from the crimped tow may be subjected to a steam setting process.

The thus prepared staple fibers may then be spun into a yarn by a conventional cotton yarn, worsted yarn or woolen yarn spinning method. A textile blend consisting of a yarn resulting from high-shrink drawn filaments which was not been subjected to the setting procedure and a yarn resulting from low-shrunk drawn filaments subjected to the setting procedure exhibits a bulky hand, in addition to a soft touch. Accordingly, such a textile blend exhibits a more favorable hand. For best results, the blend ratio of highly-shrunk yarn to low-shrunk yarn is in a range of from 0.3 to 0.5. The yarn of the present invention may also be blended with wool or acrylic fibers. In this case, if the yarn of the present invention is used in an amount of 50% or more, the conspicuous effect of the present invention can be realized.

The yarn thus prepared may be converted to a woven or knitted fabric. Particularly, when heavy gage fabrics or fabrics having a loose structure, such as twill fabric, basket weave and pile fabric, are formed from the yarn of the present invention, the soft hand effect of the present invention is satisfactorily imparted thereto. Then, the fabric is scoured. It is desirable that the scouring prcedure is effected under high relaxation. That is, it is preferable that instead of using suspension scouring wherein scouring is effected under quiet relaxation, the fabric is relieved from tension and fully relaxed while a satisfactory crumpling effect is imparted thereto by stirring or circulating the fabric and the scouring liquid. Such a high relaxation scouring causes the scoured fabric to exhibit a full, soft, heavy gage hand resembling the hand of woolen cloth. In contrast it is difficult to impart a full state to the conventional polyester fabric.

This is probably because the conventional polyester filaments have a low orientation fibrous micro-structure and thus, the filaments are easily influenced by the action of external force under heat. In any event, by applying the above mentioned procedures to the polyester filaments, it is possible to obtain a soft woven or knitted fabric having a close texture and a unique hand which is useful for making into autumn and winter clothing and or clothing for ladies, which fabric is quite different from fabrics resulting from conventional polyester filaments.

The polymer usable for the present invention may be, in addition to polyesters, a so-called modified polyester having incorporated thereinto a third constituent. In short, any fiber-forming polyesters consisting mainly of polyethylene terephthalate may be used in the process of the present invention. A polyester containing sodium sulfoisophthalate is preferred.

The effect of the present invention can also be afforded to the filaments. Because the filaments to which the softening effect was imparted exhibit a soft, unique hand which could not have been attained in the conventional polyester filaments, it is expected that the woven or knitted fabric resulting from such filaments exhibits a unique hand. That is, when staple fibers cut from the filaments are converted to a woven or knitted fabric, the cut ends of the staple fibers freely float on the surface of the fabric. Because the floated fraction is remarkably soft, a much softer feeling is imparted to the fabric. Also, the staple fibers themselves are entangled with each other because of their softness. This entanglement of the fibers is effective for imparting a full voluminous feeling to the fabric. Accordingly, a further improved hand effect is obtained.

The polyester fiber of the present invention is particularly suitable for use in clothing since it contains ethylene terephthalate as its main recurring unit. Further, the fiber is excellent in its dyeing fastness properties, because it contains —$SO_3M$ groups.

The present invention will further be illustrated below by way of the following non-limitative examples. The various properties as referred to herein may be determined as follows.

Degree of Orientation Δn

The degree of orientation, i.e. the double refraction index, is represented by the difference between the refractive index to a light polarized perpendicular to the fiber axis and the refractive index to a light polarized parallel to the fiber axis. This is measured using a polarizing microscope provided with a Belleck compensator with the use of tricresyl phosphate.

Degree of Crystallization $\chi_\rho$

The specific gravity $\rho$ of the polyester fiber is measured in a usual manner using a density gradient tube composed of n-heptane and carbon tetrachloride at a constant temperature water bath of 25° C., and the degree of crystallization is calculated by the following equation:

$$\chi_\rho = \left(0.7491 - \frac{1}{\rho}\right)/0.06178.$$

Dyestuff Build-Up

The polyester fiber is dyed in a bath containing 5% o.w.f. of Aizen Cathilon Red GTLH (made by Hodogaya Chemical Industries, Inc., Japan) at 100° C. for 60 minutes, at a liquor to good ratio of 100:1, and the dyestuff build-up is calculated by the amount of the dyestuff not absorbed.

Breaking Strength and Elongation

These are determined by the ASTM method D2256-66T.

Strength at Final Turning Point

This is represented by the load at a point where the curvature the load-elongation curve as obtained in the above-mentioned ASTM method is finally changed.

EXAMPLE 1

Ethylene terephthalate polymer of an inherent viscosity of 0.59 and having 2.6 mol % of sodium sulfoisophthalate copolymerized therewith was processed into a fiber of 3 denier under the conditions shown in Table 1 below. The ethylene terephthalate polymer employed in Run No. 3 had 8.3 mol % of isophthalic acid and 1.9 mol % of sodium sulfoisophthalate copolymerized therewith instead of 2.6 mol % of sodium sulfoisophthalate.

TABLE 1

| Run No. | Obtained Fiber | Spinning Speed (m/min) | Draw Ratio | Drawing System | Heat Treatment under Relaxation Temperature (°C.) × time (sec) | Over-feed (%) | Low Temperature Drawing$^{(iii)}$: Draw Ratio | Remarks |
|---|---|---|---|---|---|---|---|---|
| 1 | Normal Staple Fiber | 500 | 4.8 | Hot water drawing$^{(i)}$ | | | | |
| 2 | Normal Drawn Filament | 1,200 | 3.2 | Hot roll (87° C.) + Slit Heater (190° C.) | | | | |
| 3 | Normal Drawn Filament | 300 | 4.9 | Hot pin (85° C.) + Hot Plate (130° C.) | | | | |
| 4 | Deep-dyeable Filament | 1,200 | 2.05 | Hot roll (90° C.) + Hot Plate (130° C.) | 180 × 4 | 5 | 1.4 | The Invention |
| 5 | Deep-dyeable Filament | 1,200 | 2.05 | Hot roll (90° C.) + Hot Plate (130° C.) | 180 × 0.6 | 5 | 1.4 | The Invention |
| 6 | Deep-dyeable Filament | 1,200 | 2.05 | Hot roll (90° C.) + Hot Plate (130° C.) | 180 × 0.3 | 5 | 1.4 | The Invention |
| 7 | Drawn Filament | 4,060 | 1.255 | Direct drawing$^{(ii)}$ | | | | |
| 8 | Drawn Filament | 4,060 | 1.26 | | | | | Filament as spun was heated at 120° C. before taking-up |
| 9 | Drawn Filament | 4,060 | 1.26 | Law temperature drawing$^{(iii)}$ | | | | |

TABLE 1-continued

| Run No. | Obtained Fiber | Spinning Speed (m/min) | Draw Ratio | Drawing System | Heat Treatment under Relaxation Temperature (°C.) × time (sec) | Over-feed (%) | Low Temperature Drawing(iii): Draw Ratio | Remarks |
| --- | --- | --- | --- | --- | --- | --- | --- | --- |
| 10 | Partially Oriented Filament | 4,060 | | | | | | |
| 11 | Deep-dyeable Staple Fiber | 3,000 | | | 170 × 3 | 4 | 1.38 | The Invention |
| 12 | Deep-dyeable Filament | 3,200 | | | 180 × 4 | 5 | 1.4 | The Invention |
| 13 | Deep-dyeable Filament | 3,200 | | | 180 × 0.6 | 5 | 1.4 | The Invention |
| 14 | Deep-dyeable Filament | 3,200 | | | 180 × 0.3 | 5 | 1.4 | The Invention |
| 15 | Deep-dyeable Filament | 5,000 | | | 180 × 4 | 5 | 1.15 | The Invention |
| 16 | Deep-dyeable Filament | 5,000 | | | 180 × 0.6 | 5 | 1.15 | The Invention |
| 17 | Deep-dyeable Filament | 5,000 | | | 180 × 0.3 | 5 | 1.15 | The Invention |
| 18 | Deep-dyeable Filament | 5,000 | | | 180 × 4 | 5 | 1.2 | The Invention |
| 19 | Deep-dyeable Filament | 5,000 | | | 180 × 4 | 5 | 0 | |

(i)The fiber was drawn in water at 89° C. and heat set on set rolls at 200° C.
(ii)The filament was drawn on a hot roll at 210° C. immediately after spinning.
(iii)Low temperature drawing was carried out at 40° C.

Figure 2:
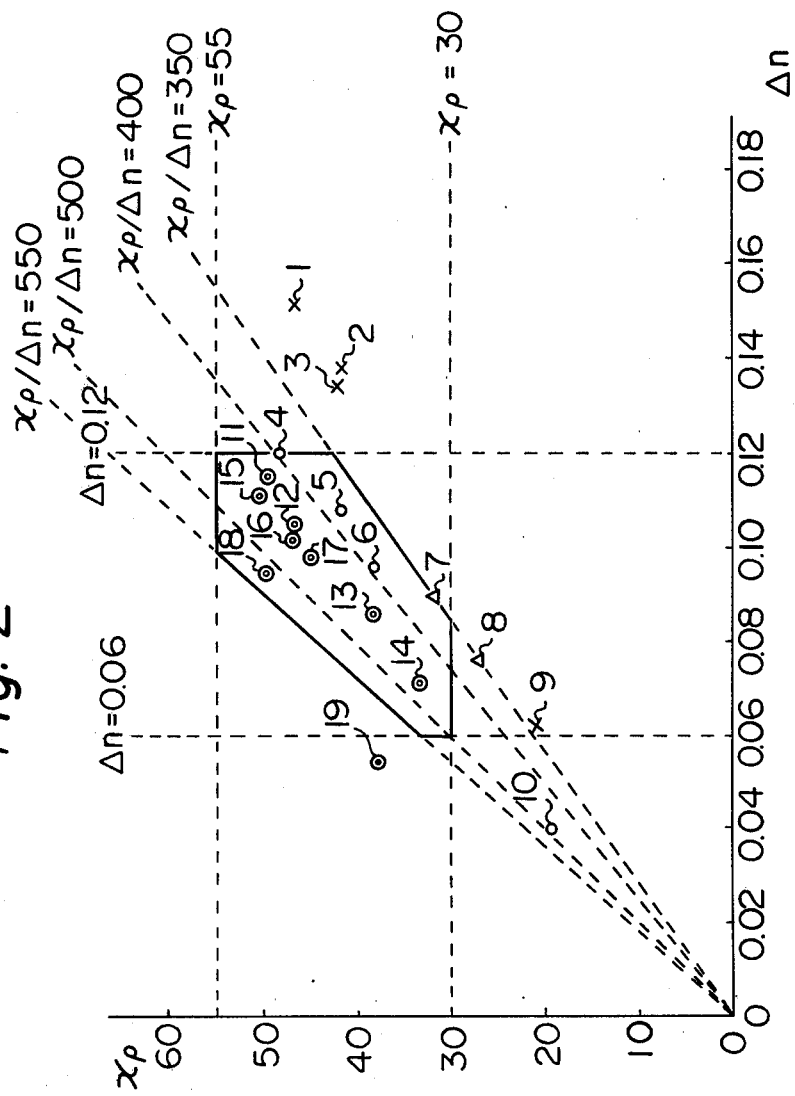
FIG. 2 is a graph showing the relationship between the degree of orientation $\Delta n$ and the degree of crystallinity $\chi_p$ of various polyester fibers.

The results are shown in Table 2 below. Further, the dyestuff build-up of the resultant fibers relative to their $\chi_p$, $\Delta n$ and $\chi_p/\Delta n$ is summarized in FIG. 2. In FIG. 2, the numerals represent a run number, and ⊙ represents the dyestuff build-up of not lower than 90% (highly deep color), ○ represents a dyestuff build-up of from 80 to 90% (deep color), △ represents a dyestuff build-up of from 60 to 80% (middle color) and X represents a dyestuff build-up of lower than 60%.

TABLE 2

| Run No. | Breaking Strength (g/d) | Breaking Elongation (%) | Dyestuff Build-up (%) | Other Feature |
| --- | --- | --- | --- | --- |
| 1 | 3.60 | 27.1 | 11.0 | Very scarcely dyed in boiling water. Poor pilling resistance. |
| 2 | 3.36 | 16.0 | 20.3 | Very scarcely dyed in boiling water. Poor pilling resistance. |
| 3 | 3.93 | 30.5 | 27.8 | Dyed only light color in boiling water. |
| 4 | 2.13 | 41.5 | 89.4 | Dyed deep color in boiling water. |
| 5 | 2.26 | 39.1 | 88.2 | Dyed deep color in boiling water. |
| 6 | 2.34 | 37.0 | 87.7 | Dyed deep color in boiling water. |
| 7 | 2.31 | 38.0 | 77.7 | Dyed medium color in boiling water. |
| 8 | 2.46 | 47.2 | 60.5 | Dyed medium color in boiling water. |
| 9 | 3.60 | 28.7 | 38.0 | Dyed only light color in boiling water. Large shrinkage in boiling water (34.1%) and low processability. |
| 10 | 1.32 | 117 | — | Strength at final turning point of 0.8 g/d. Too much elongation and too much shrinkage in boiling water. |
| 11 | 2.11 | 55 | 99.8 | Strength at final turning point of 1.6 g/d. Dyed highly deep color in boiling water. Excellent pilling resistance and processability. |
| 12 | 2.03 | 50.9 | 99.8 | Dyed highly deep color in boiling water. |
| 13 | 2.25 | 47.7 | 99.6 | Dyed highly deep color in boiling water. |
| 14 | 2.16 | 48.1 | 99.5 | Dyed highly deep color in boiling water. |
| 15 | 2.16 | 47.8 | 99.8 | Dyed highly deep color in boiling water. |
| 16 | 2.29 | 43.7 | 99.5 | Dyed highly deep color in boiling water. |
| 17 | 2.23 | 45.0 | 99.7 | Dyed highly deep color in boiling water. |
| 18 | 1.91 | 63 | 99.9 | Strength at final turning point of 1.3 g/d. Dyed highly deep color in boiling water. Too high elongation. |
| 19 | 1.57 | 88 | 99.8 | Strength at final turning point of 0.9 g/d. Too much elongation and poor processability. |

EXAMPLE 2

A fiber-forming polyester was melt-spun through a spinneret so as to form filaments having a degree of orientation $\Delta n$ of 0.04, as represented in terms of the double refraction index. The filaments were heated at an overfeed of 10% at a temperature of 200° C. to crystallize them to a crystallinity $\chi_p$ of about 41%. Then, the crystallized filaments were drawn at a low temperature of 40° C. at a draw ratio of 1.4. Subsequently, the drawn filaments were brought into contact with a roller heated to a temperature of 180° C. so as to heat treat them while the length of the filaments was maintained at a constant value. Thereafter, the heat-treated filaments were crimped by using a stuffing box type crimping machine, and dried, cut to provide staple fibers having a length of 51 mm. Separately, the drawn filaments were directly crimpled by using the stuffing box type crimping machine without being brought into contact with the heated roller, dried and then cut to provide staple fibers having a length of 51 mm. A fiber blend consisting of 6 parts by weight of the former fiber and 4 parts by weight of the latter fiber was converted to a yarn having a yarn count of 30/2. The yarn was converted to a twill fabric. The twill fabric was highly relaxed in a jet of boiling water, and dye-finished. The dyed fabric exhibited a hand quite different from that of conventional polyester fabric. That is, it exhibited a softness resembling that of a melton cloth made of natural wool.

Comparative Example

In Example 2, when a tow having a degree of orientation $\Delta n$ of 0.01, as expressed in terms of the double refraction index, prepared at a spinning speed of 1200 m/min, was heat treated at a temperature of 200° C. by using a heater, the tow was fused with the heater and further running of the tow became impossible. In order to avoid this fusion, the temperature at which the heat treatment was effected was reduced down to 110° C. In this case, a satisfactory crystallization was not attained in the tow. When the tow was converted to woven fabric, no improvement in the softness of the fabric was recognized. Also, when the tow was heat treated under tension while being drawn at a draw ratio of 1.5, the tow was not fused even at a temperature of 200° C. However, when the tow was converted to a woven fabric, the resultant fabric did not exhibit a desired hand.

EXAMPLE 3

A modified polyester containing 2.6% by weight of sodium 5-sulfoisophthalate was melt-spun at a spinning speed of 1000 m/min through a spinneret to form a tow having a degree of orientation $\Delta n$ of 0.008 as expressed in terms of the double refraction index. The tow was semi-drawn at a draw ratio of 1.5 while passing it through a warm water bath maintained at a temperature of 80° C. so as to cause the tow to be slightly oriented. The resultant tow had a degree of orientation $\Delta n$ of 0.05. This tow was heat treated at an overfeed of 5% at a temperature of 180° C. to crystallize it to a crystallinity $\chi_p$ of 37%. The crystallized tow was cold drawn at a draw ratio of 1.4. Then, the cold-drawn tow was crimped by using a stuffing box type crimping machine, and set by blowing hot air having a temperature of 150° C. against the crimped tow on a conveyor. Then, the tow was bias cut to provide staple fibers having a length of 64/89 mm. Thereafter, the staple fibers were blended with wool in an amount of 30% by weight based on the total weight of the staple fibers and the wool. The resultant blend was converted to a yarn having a yarn count of 2/24. The yarn was then converted to a plain weave fabric. Subsequently, the plain weave fabric was highly relaxed and, then, dyed. Thereafter, the dyed fabric was suitably raised. Thus, a very soft fabric closely resembling flano was obtained. Also, the plain weave fabric exhibited an excellent raising property.

In addition, the weave pattern of the fabric had a close texture and a highly voluminous feeling.

EXAMPLE 4

A polyeseter was melt-spun at a spinning speed of 4000 m/min through a spinneret to form undrawn filaments having a degree of orientation $\Delta n$ of 0.06, as expressed in terms of the double refraction index and a denier of 65. The undrawn filaments were heat treated at a temperature of 220° C. while undergoing shrinkage of 30% so as to crystallize them to a crystallinity $\chi_p$ of 46%. The resultant low-oriented, highly-crystallized filaments were drawn at normal temperature at a drawn ratio of 1.6 to convert them to filaments having a denier of 53. Then, the resultant filaments were converted to a tricot. The resultant tricot exhibited a softer hand than that of a tricot made of rayon. In this case, when the drawing procedure was carried out while the filaments were being brought into contact with a plate heated to a temperature of 180° C., the resulting tricot exhibited a stiff hand. Also, when the filaments were drawn at a low temperature at a draw ratio of 2.1, satisfactory results could not be obtained. Conversely, when the filaments were drawn at a draw ratio of 1.2, the tricot resulting from such filaments exhibited a low elastic recovery. In addition, when clothing made of such a tricot was worn, there was the risk that the clothing was weak at the elbows.

We claim:

1. A deep-dyeable polyester fiber comprising recurring units consisting primarily of ethylene terephthalate and —SO$_3$M groups in which M is an alkali metal, and having a degree of crystallinity $X_p$ of from 30 to 55%, a degree of orientation $\Delta n$ of from 0.06 to 0.12 and $X_p/\Delta n$ of from 350 to 550, prepared by the process comprising:

melt-spinning a fiber-forming polyester containing recurring units consisting mainly of ethylene terephthalate through a spinneret to form a slightly oriented filament having a double refraction index $\Delta n$ of from 0.02 to 0.08;

heat treating said filament at an elevated temperature without applying a positive tension or drawing thereto to obtain a highly crystallized filament having a degree of crystallinity $X_p$ of from 30 to 55%; and drawing said highly crystallized filament at a low temperature at a draw ratio of an increased ratio in denier during said heat treatment of from 1.0 to 1.7.

2. A polyester fiber as claimed in claim 1, wherein $\chi_p/\Delta n$ is from 400 to 500.

3. A polyester fiber as claimed in claim 1, having a strength at final turning point $S_y$ of higher than 1.2 g/d.

4. A polyester fiber as claimed in claim 1, having a breaking strength $S_t$ of lower than 2.5 g/d.

* * * * *